United States Patent
Thibeault et al.

(10) Patent No.: US 10,824,871 B1
(45) Date of Patent: Nov. 3, 2020

(54) METHOD AND APPARATUS FOR OBTAINING UNIQUE SIGNATURES FOR A SPACE THROUGH COMPRESSED IMAGING AND SEMI-REPEATED MOVEMENTS

(71) Applicant: HRL Laboratories, LLC, Malibu, CA (US)

(72) Inventors: Corey M. Thibeault, Encino, CA (US); Narayan Srinivasa, Hillsboro, OR (US)

(73) Assignee: HRL Laboratories, LLC, Malibu, CA (US)

(*) Notice: Subject to any disclaimer, the term of this patent is extended or adjusted under 35 U.S.C. 154(b) by 138 days.

(21) Appl. No.: 15/159,488

(22) Filed: May 19, 2016

Related U.S. Application Data (60) Provisional application No. 62/163,858, filed on May 19, 2015.

(51) Int. Cl.
| | | |
|---|---|---|
| G06K 9/00 | (2006.01) | |
| G06K 9/62 | (2006.01) | |
| H04N 19/85 | (2014.01) | |

(52) U.S. Cl.
CPC ....... *G06K 9/00691* (2013.01); *G06K 9/6269* (2013.01); *H04N 19/85* (2014.11)

(58) Field of Classification Search
CPC ... G06K 9/00691; G06K 9/6269; H04N 19/85
See application file for complete search history.

(56) References Cited

U.S. PATENT DOCUMENTS

| | | | | |
|---|---|---|---|---|
| 7,778,466 | B1* | 8/2010 | Medasani | G06K 9/00744 382/181 |
| 2013/0108103 | A1* | 5/2013 | Thueux | G06K 9/3233 382/103 |
| 2017/0371492 | A1* | 12/2017 | Chen | G06F 3/0488 |
| 2018/0184992 | A1* | 7/2018 | Li | A61B 6/488 |

OTHER PUBLICATIONS

Chen, Diansheng, Yuxin Chen, and Tianmiao Wang. "Moving object detection by multi-view geometric constraints and flow vector classification." Robotics and Biomimetics (ROBIO), 2010 IEEE International Conference on. IEEE, 2010.*

Randall C. Smith and Peter Cheeseman on the Representation and Estimation of Spatial Uncertainty, The International Journal of Robotics Research Dec. 1986, 5, pp. 56-68, doi:10.1177/027836498600500404.

(Continued)

*Primary Examiner* — Pinalben Patel
(74) *Attorney, Agent, or Firm* — Tope-McKay & Associates (57) ABSTRACT

Described is a system and method for generating a unique signature for a space. During operation, the system causes a mobile platform to make one or more passes through the space along a repeatable path. While moving through the space, the system captures an image of the space around the mobile platform. A filter is applied to the image to generate vertical bins, the vertical bins being one-dimensional vectors of the space around the mobile platform. The one-dimensional vectors are combined over time to create a two-dimensional trace, with the two-dimensional trace being a unique signature for the space.

20 Claims, 8 Drawing Sheets

(56) References Cited

OTHER PUBLICATIONS

Buschka, P., & Saffiotti, A. (2002). A virtual sensor for room detection. In Intelligent Robots and Systems, 2002. IEEE/RSI International Conference on, vol. 1, pp. 637-642, IEEE.
Mozos, O. M., Stachniss, C., & Burgard, W. (Apr. 2005). Supervised learning of places from range data using adaboost. In Robotics and Automation, 2005. ICRA 2005. Proceedings of the 2005 IEEE International Conference on, pp. 1730-1735, IEEE.
Mozos, Oscar Martinez, et al. "Categorization of indoor places using the kinect sensor," Sensors 12.5 (2012): pp. 6695-6711.
Yamada, S. "Recognizing environments from action sequences using self-organizing maps." Applied Soft Computing 4.1 (2004): pp. 35-47.
Yamada, S. "Evolutionary behavior learning for action-based environment modeling by a mobile robot." Applied Soft Computing 5.2 (2005): pp. 245-257.
Suykens, Johan AK, and Joos Vandewalle. "Least squares support vector machine classifiers." Neural processing letters 9.3 (1999): pp. 293-300.
Maass, Wolfgang, Thomas Natschläger, and Henry Markram. "Real-time computing without stable states: A new framework for neural computation based on perturbations." Neural computation 14.11 (2002): pp. 2531-2560.
Friedman, Nir, Dan Geiger, and Moises Goldszmidt. "Bayesian network classifiers." Machine learning 29.2-3 (1997): pp. 131-163.
Kudo, Mineichi, and Jack Sklansky. "Comparison of algorithms that select features for pattern classifiers." Pattern recognition 33.1 (2000): pp. 25-41.

\* cited by examiner

METHOD AND APPARATUS FOR OBTAINING UNIQUE SIGNATURES FOR A SPACE THROUGH COMPRESSED IMAGING AND SEMI-REPEATED MOVEMENTS

GOVERNMENT RIGHTS

This invention was made with government support under U.S. Government Contract Number HR0011-09-C-0001. The government has certain rights in the invention.

CROSS-REFERENCE TO RELATED APPLICATIONS

This is a non-provisional patent application of 62/163,858, filed on May 19, 2015, the entirety of which is hereby incorporated by reference.

BACKGROUND OF INVENTION (1) Field of Invention

The present invention is related to image classifiers and, more specifically, to a method for obtaining unique signatures for learning and classification using low resolution images.

(2) Description of Related Art

Classification and learning systems that use imaging are effective when using high-resolution images. However, a problem exists when using low-resolution images. Simultaneous Localization and Mapping (SLAM) is one of the most used and research methods that applies to this problem (see the List of Incorporated Literature References, Reference No. 1). This is where a representation of the space is constructed while also keeping track of location. The SLAM approach deals with mapping the entire environment as it is explored, making the approach a memory intensive task. In addition, the SLAM process requires multiple independent sensors.

There have been a number of other studies that deal with room detection that use low-dimensional sensory information. Buschka et al., for example, employed range and odometric information to perform room segmentation and feature extraction (see Literature Reference No. 2). The extracted features could be used for navigation or segmentation. However, the Buschka method is only appropriate for ground-based robotics and requires precise telemetry.

In other work, Mozos et al. used scanned laser range data to create semantic maps that were used to classify rooms in an environment (see Literature Reference No. 3). The method described by Mozos requires multiple precise measurements from a consistent position each time a room is scanned. In addition, a strong classifier is required to interpret the low-dimensional range information. These ideas were also extend to include information from a Kinect sensor to create the feature vector as described in Literature Reference No. 4.

Yamada et al. used low-dimensional sensors, in this case IR range finders, and maps a room based on its shape (see Literature Reference Nos. 5 and 6). This is performed by a wall following task. Further, the work of Yamada requires that the entire space must be traversed before a classification can be done (unlike the single pass as described in the present disclosure).

Thus, a continuing need exists for a system that, using low-dimensional signals, can produce enough information to accurately separate them during classification.

SUMMARY OF INVENTION

Described is a system and method for generating a unique signature for a space. During operation, the system causes a mobile platform to make one or more passes through the space along a repeatable path. While moving through the space, the system captures an image of the space around the mobile platform. A filter is applied to the image to generate vertical bins, the vertical bins being one-dimensional vectors of the space around the mobile platform. The one-dimensional vectors are combined over time to create a two-dimensional trace, with the two-dimensional trace being a unique signature for the space.

In another aspect, the system is mounted on a mobile platform and further comprising a sensor mounted on the mobile platform, the sensor generating the image of the space around the mobile platform.

Additionally, the image is captured and filtered into the vertical bins, with the vertical bins being sent directly to a continuous classifier while the mobile platform moves through the space along the repeatable path.

In yet another aspect, the image is captured, filtered into the vertical bins and combined to create the two-dimensional trace while the mobile platform makes the one or more passes through the space along the repeatable path.

In another aspect, a classifier may be included, with the two-dimensional trace being added to the classifier for later classification.

Finally, the present invention also includes a computer program product and a computer implemented method. The computer program product includes computer-readable instructions stored on a non-transitory computer-readable medium that are executable by a computer having one or more processors, such that upon execution of the instructions, the one or wore processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with, reference to the following drawings, where.

DETAILED DESCRIPTION

The present invention is related to image classifiers and, more specifically, to a method for obtaining unique signatures for learning and classification using low resolution images. The following description is presented to enable one of ordinary skill in the art to make and use the invention and to incorporate it in the context of particular applications. Various modifications, as well as a variety of uses in different applications will be readily apparent to those skilled in the art, and the general principles defined herein mays be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Cited Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Randall C. Smith and Peter Cheeseman On the Representation and Estimation of Spatial Uncertainty, The International Journal of Robotics Research December 1986 5: 56-68, doi:10.1177/027836498600500404.
2. Buschka, P., & Saffiotti, A. (2002). A virtual sensor for room detection. In Intelligent Robots and Systems, 2002. IEEE/RSJ International Conference on (Vol, 1, pp. 637-642). IEEE.
3. Mozos, O. M., Stachniss, C., & Burgard, W. (2005, April). Supervised learning of places from range data using adaboost. In Robotics and Automation, 2005. ICRA 2005. Proceedings of the 2005 IEEE International Conference on (pp. 1730-1735). IEEE.
4. Mozos, Oscar Martinez, et al. "Categorization of indoor places using the kinect sensor." Sensors 12.5 (2012) 6695-6711.
5. Yamada, S. "Recognizing environments from action sequences using self-organizing maps." Applied Soft Computing 4.1 (2004): 35-47.
6. Yamada, S. "Evolutionary behavior learning for action-based environment modeling by a mobile robot," Applied Soft Computing 5.2 (2005): 245-757.
7. Suykens, Johan A K, and Joos Vandewalle. "Least squares support vector machine classifiers," Neural processing letters 9.3 (1999): 293-300.
8. Maass, Wolfgang, Thomas Natschläger, and Henry Markram. "Real-time computing without stable states: A new framework for neural computation based on perturbations." *Neural computation* 14.11 (2002): 2531-2560.
9. Friedman, Nir , Dan Geiger, and Moises Goldszmidt. "Bayesian network classifiers." *Machine learning* 29.2-3 (1997): 131-163.
10. Kudo, Mineichi, and Jack Sklansky. "Comparison of algorithms that select features for pattern classifiers." *Pattern recognition* 33.1 (2000): 25-41.

(2) Principal Aspects

Various embodiments of the invention include three "principal" aspects. The first is a system for obtaining unique signatures. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
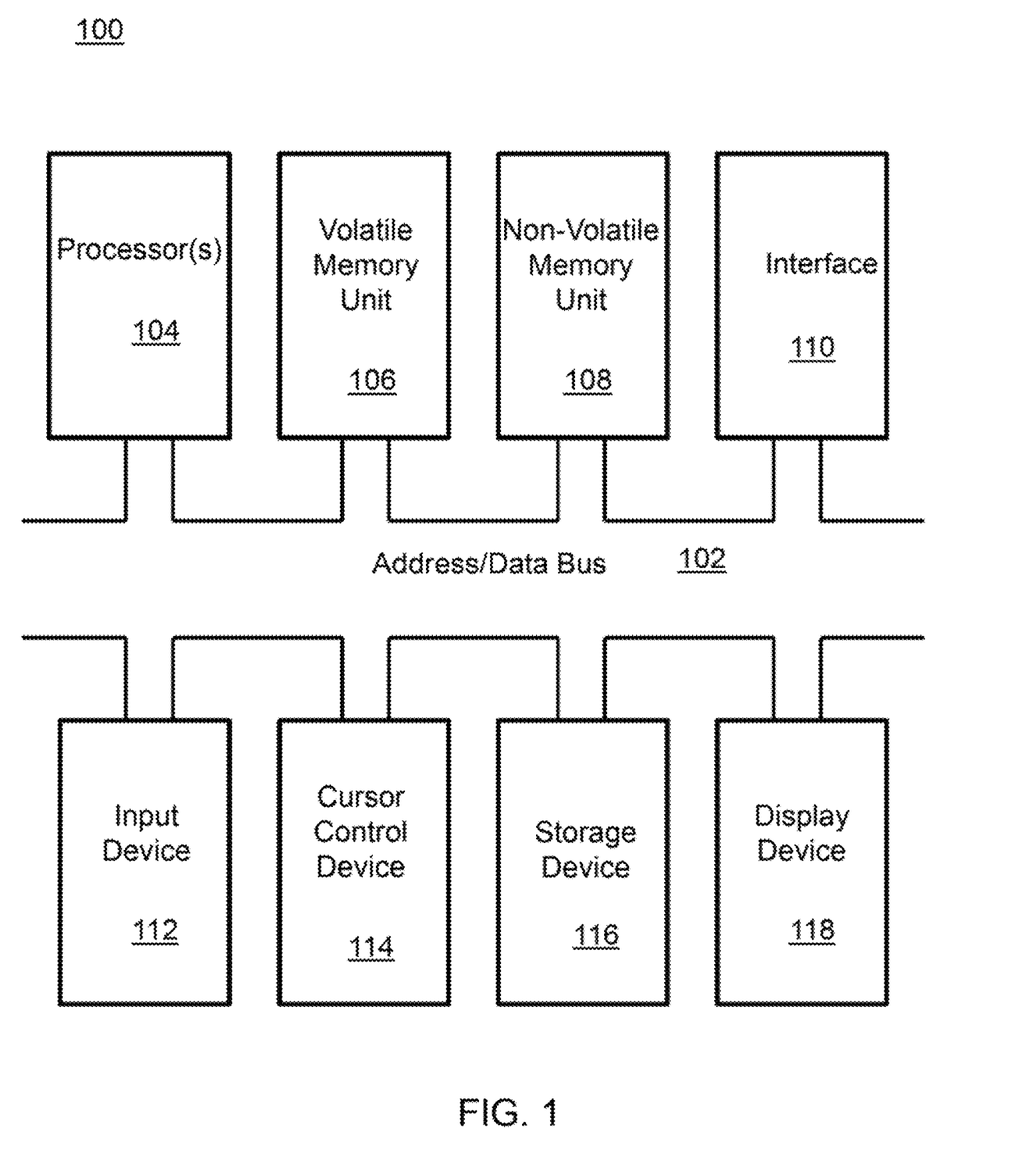
FIG. 1 is a block diagram depicting the components of a system according to various embodiments of the present invention.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static. RAM, dynamic RAM, etc.) coupled with the address/data bus 102, wherein a volatile memory unit 106 is configured to store information and instructions for the processor 104. The computer system 100 further may include a non-volatile memory unit 108 (e.g. read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g. wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than or in addition to an alphanumeric input device or any other type of input device that may be required to perform the features and functions as described herein, including a camera, sensors, microphone, etc. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
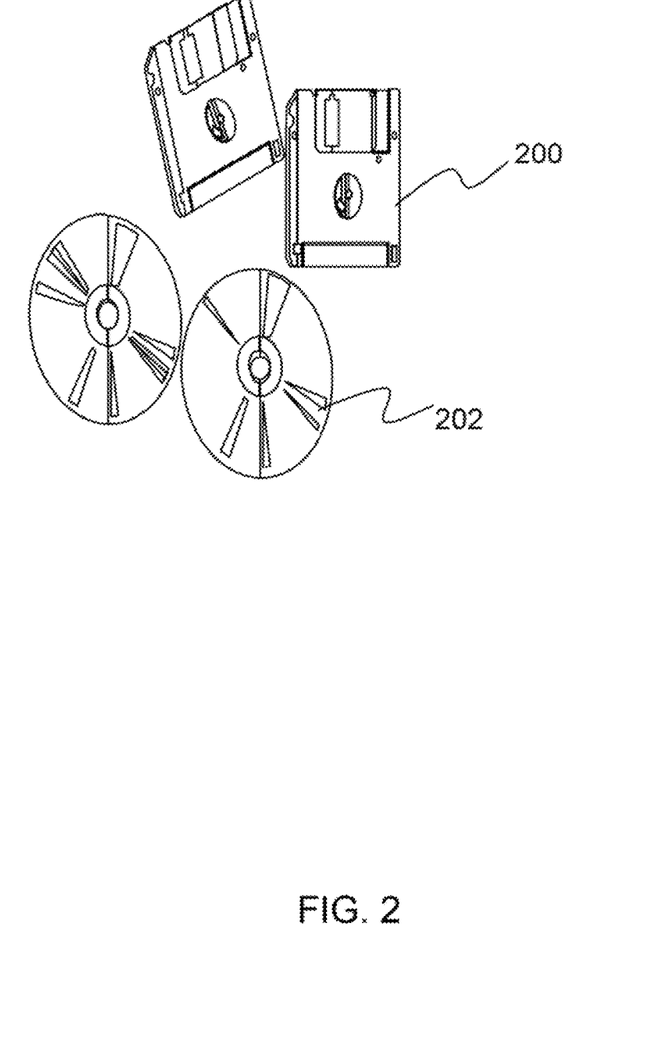
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

This disclosure provides a method and system for obtaining a unique signature for a space through compressed imaging and semi-repeated movements. Images are captured while the system is moved via a mobile platform through a space. These images are compressed into vertically oriented bins resulting in one-dimensional vectors. The vectors are then stacked to create a single two-dimensional trace that can be used as a unique identifier for that space. On many autonomous systems power and processing are limited and methods for accomplishing recognition tasks with limited resources such as this are important for successful operation. Thus, the system provides a computationally and power efficient method for creating unique identifiers of a space that can used for learning and classification. Using this method an enclosed space can be encoded using low resolution images, with the enclosed space being used directly for classification rather than many other computer vision algorithms that require complex processing. The method and system as described herein can be implemented in a variety of systems, including unmanned air vehicles that do not have larger computational resources, as a component of intelligent manufacturing, or for autonomous target tracking, etc.

(4) Specific Details of Various Embodiments

As noted above, this disclosure provides a method and system for obtaining a unique signature for a space through compressed imaging and semi-repeated movements. The method of creating a signature for a location relies on the system acting in a semi-repeatable way. An example of this would be an air vehicle (i.e., unmanned aerial vehicle or drone) flying a consistent flight path when entering a room. In some embodiments, the aerial vehicle or drone is automatically controlled by the system. In other embodiments, the aerial vehicle or drone is piloted by a human operator. During this repeated activity the system captures images at set intervals. As the images are captured the system combines the pixel information into vertical bins. These can be combined using a simple average or with an algorithm that weights the pixel's contribution based on its location.

Figure 3A:
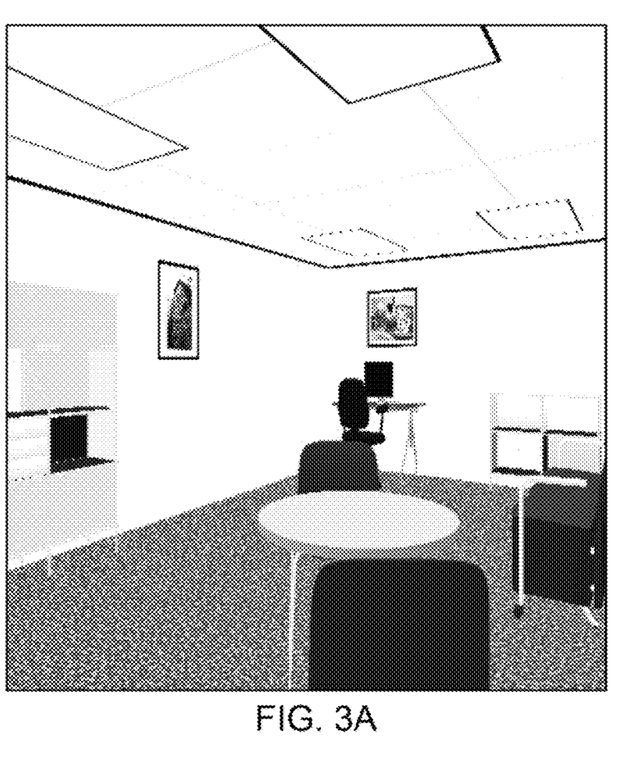
FIG. 3A is an illustration depicting an example enclosed space (i.e., room) from a system point of view.
Figure 3B:
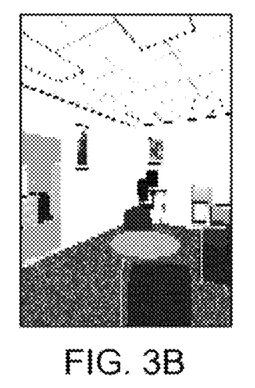
FIG. 3B is an illustration depicting a captured grayscale image of the space.
Figure 3C:
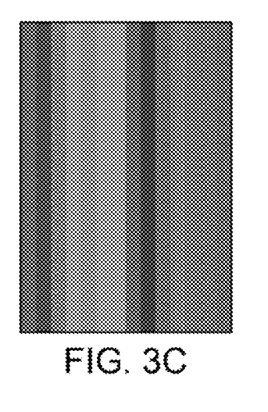
FIG. 3C is an illustration depicting a vertically binned image.

FIGS. 3A through 3C provide an example of the imaging process in a simulated environment. Specifically, FIG. 3A is an illustration depicting a simulated room from the system point of view, such as from a camera mounted on a drone or on any other mobile plaform (vehicle, robot, etc.). The system includes a camera, video camera, sensor, etc., that is operable for capturing images of the scene. For example and as depicted in FIG. 3B, the system captures greyscale image at 112×112 pixels, which then vertically bins the image, as shown in FIG. 3C. In this non-limiting example, 14 vertical bins are created.

It should be understood that additional sensor modalities can be added to the system, such as sonar and radar, to improve the classification response. Each additional modality contributes potentially separable information that can be exploited by the classifier. For instance, two walls that contained the same visual pattern, but had different textures, would be separable using depth traces, but not color traces.

These sparse representations (i.e., the vertical bins) are then added to a two-dimensional signature of the space to form a trace. This trace (composed of stacked vertical bins) can be sent to any classifier capable of processing two-dimensional dynamic signals. Non-limiting example of such classifiers are described in Literature Reference Nos. 9 and 10. Input into the classifier can occur while the images are captured or after the repeated action has completed.

Figure 4:
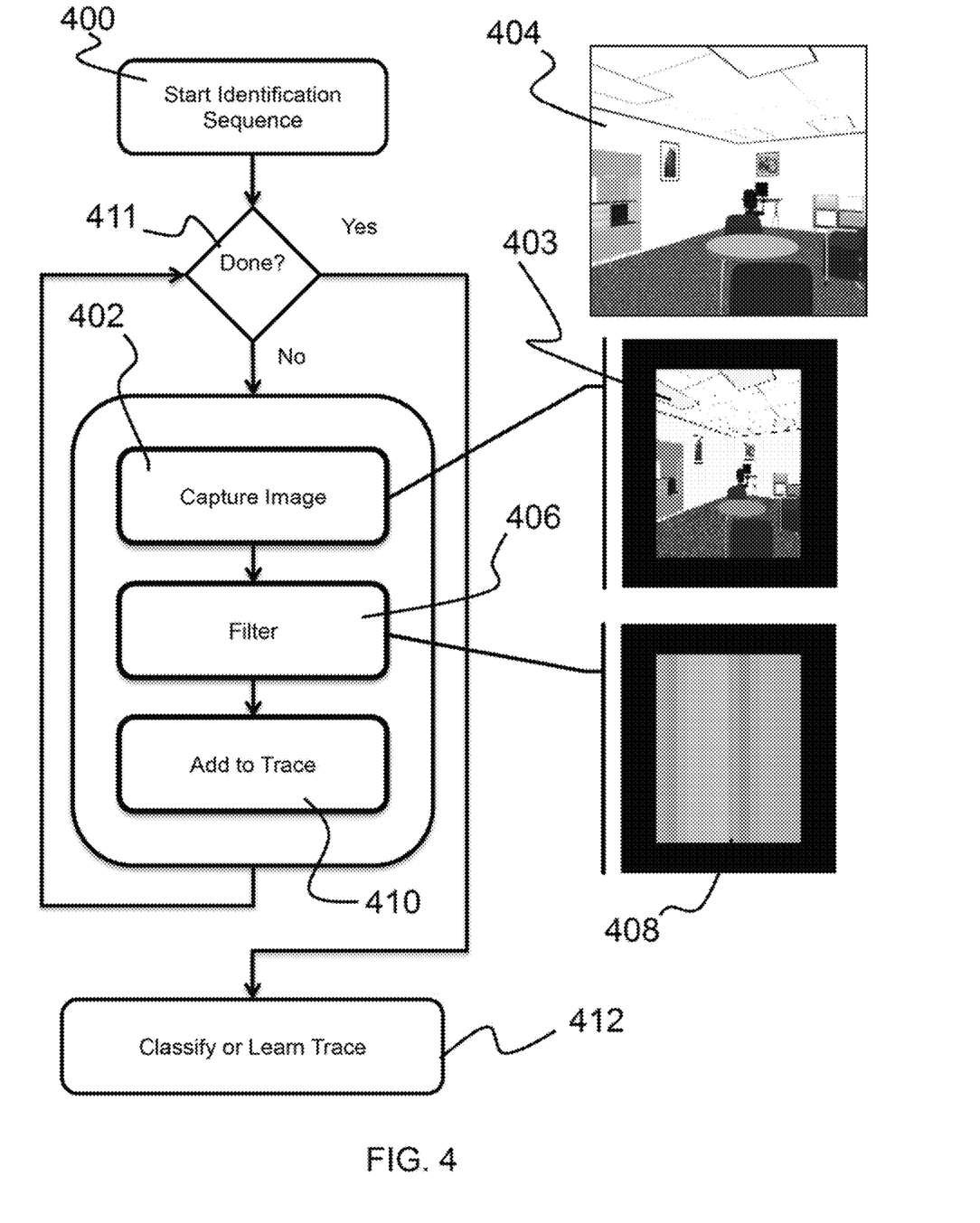
FIG. 4 is a flowchart depicting a process for obtaining a unique signature according to various embodiments of the present invention, where an entire unique signature is created before classification.

FIG. 4, for example, is a flowchart that outlines these steps for the case where the entire trace is captured and created, and then sent to the classifier. As shown, the system is initiated to start 400 an identification sequence. After initiation, the system moves through the scene 404 and captures 402 an image of the scene 404 in front of the mobile platform (e.g., drone, vehicle, robot, etc.). The image is ideally captured as a grayscale image 403 or otherwise converted to grayscale. Thereafter, a filter is applied 406 to generate vertical bins 408 of the scene 404. The filter can be a column-wise sum or mean, or any operation that maps a 2D image to a meaningful row-vector. The vertical bins 408 provide one dimensional vectors of the scene 404 which are then added (stacked) 410 to create a single, two-dimensional trace that is used as the unique identifier for that particular enclosed space (e.g., room). The system makes repeated passes over the scene 404. After a predetermined number of passes (e.g., 2, 3, etc.) are made of the enclosed space (e.g., room), the system is done 411 and then classifies 412 (if it is a novel space) the two-dimensional trace as the trace (i.e., unique identifier) for the enclosed space. The unique identifier or trace can be learned as a unique signature for that particular path through the enclosed space and also can be used for classification in subsequent passes through the space by the same or other mobile platforms.

Figure 5:
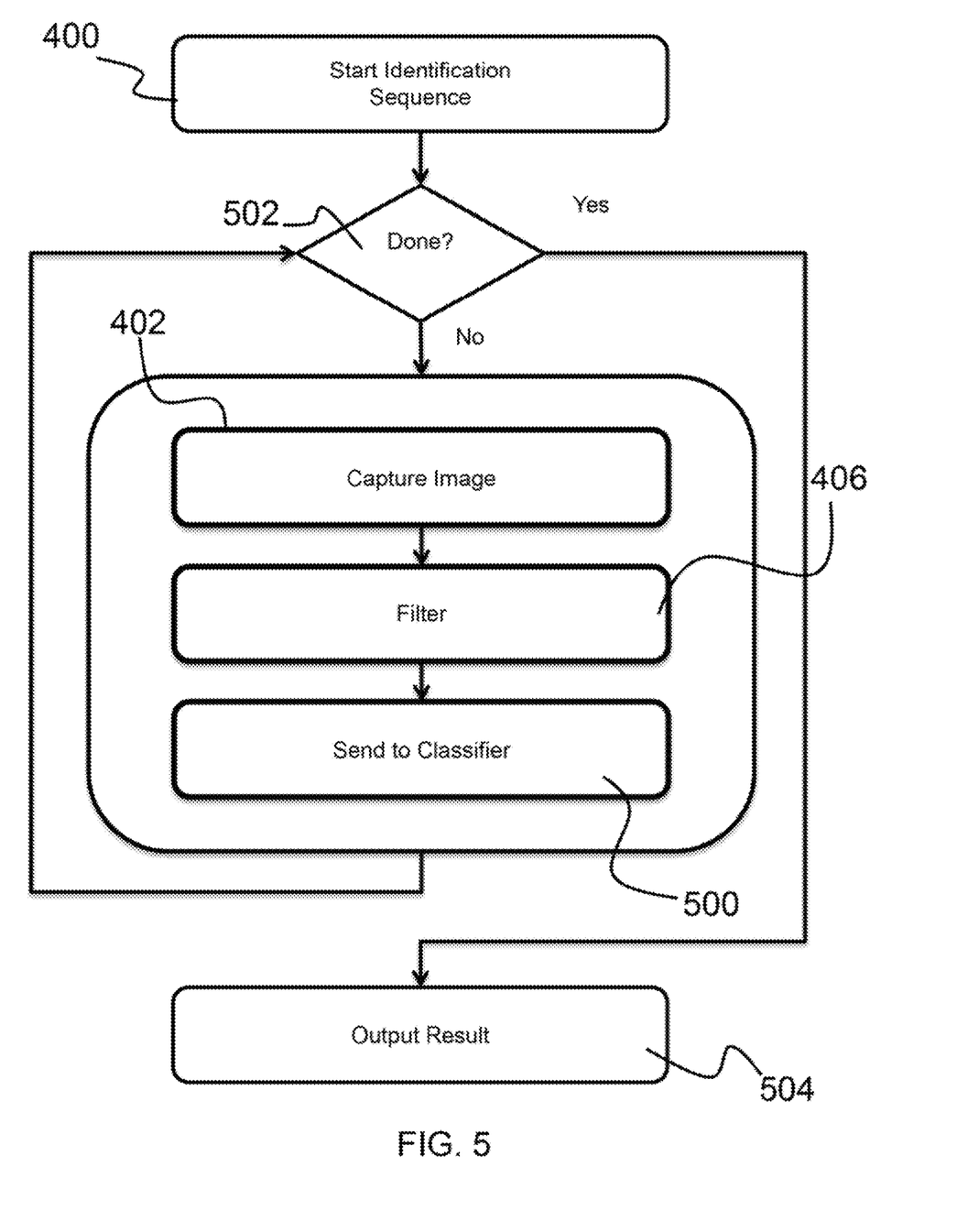
FIG. 5 is a flowchart depicting a process for obtaining a unique signature according to various embodiments of the present invention, where the space classification happens concurrently with the image capture.

Alternatively, FIG. 5 is a flowchart outlining the steps for the case where the learning/classification is concurrent with the image capture. In either case, the key to creating the traces is the repeated action or movement through the space. As was the case above, the system is initiated to start 400 an identification sequence. After initiation, the system moves through the scene and captures 402 an image (e.g., grayscale) of the scene in front of (or around, etc.) the mobile platform. Thus, in various embodiments, the system cause the mobile platform to make one or more passes through the space (scene) along a repeatable path. As a non-limiting example, the system provides instructions to the mobile platform (e.g., drone or robot, etc.) to travel forward ten feet, then reverse ten feet, and then repeat. As yet another example, the system may provide instructions to cause the mobile platform to travel forward until reaching a stopping point (such as a wall), and then reversing and repeating.

After the image is captured, a filter is applied 406 to generate the vertical bins of the scene. The vertical bins in this case are then sent 500 directly to the classifier (which stacks the vertical bins as they come in) while the platform continues imaging the scene. The classifier continues to stack the vertical bins as they come in to continuously create or update the single, two-dimensional trace that is used as the unique identifier for that particular enclosed space (e.g., room). After a predetermined number of passes are made along a path in the enclosed space (e.g., room), the system is done 502 and the final output 504 (a single, two-dimensional trace) is then provided as the unique identifier for that particular enclosed space (e.g., room). The unique identifier or signature is then saved into a memory for use in later classification.

Figure 6A:
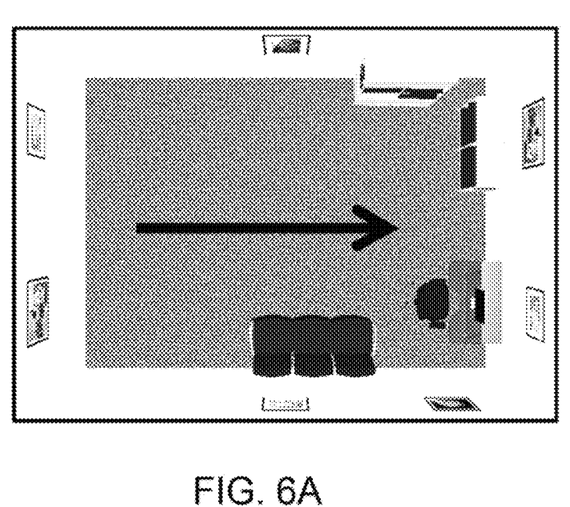
FIG. 6A is a top-down view illustration of an enclosed space.
Figure 6B:
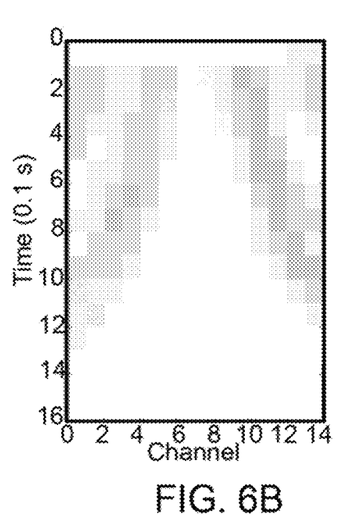
FIG. 6B is an illustration depicting the resulting two-dimensional signature after processing the visual information while moving through the enclosed space.
Figure 6C:
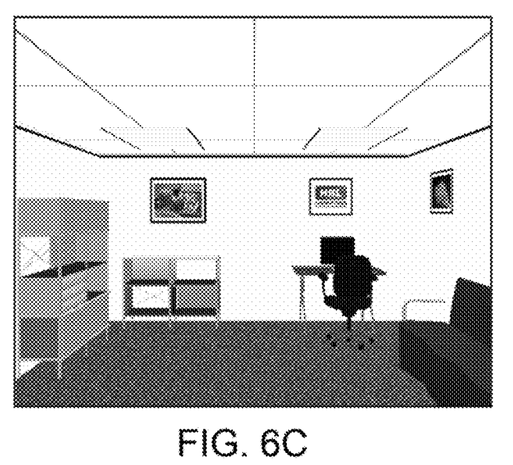
FIG. 6C is an illustration depicting a view of the enclosed space from the system point of view.
Figure 6D:
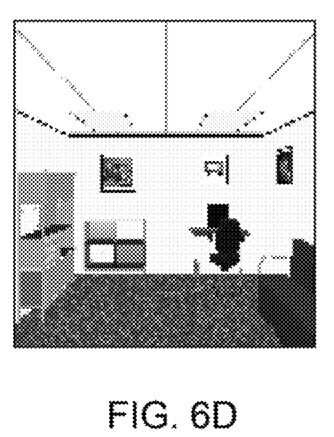
FIG. 6D is an illustration depicting an image as captured by the system.

FIGS. 6A through 6D illustrate an example of the resulting signature for a simulated room, Specifically, FIG. 6A provides a top-down view of the enclosed space. The arrow indicates the approximate flight path. FIG. 6B depicts the resulting two-dimensional signature after processing the visual information while moving through the room. In this example, the images are captured and processed at 10 Hz. Notice that the Y-axis of the plot moves downward. FIG. 6C depicts a view of the room from the system. Finally, FIG. 6D depicts an image as captured by the system (at a given time point). Note that FIGS. 6C and 6D correspond to a single sample, out of many samples captured at 10 Hz.

Figure 7A:
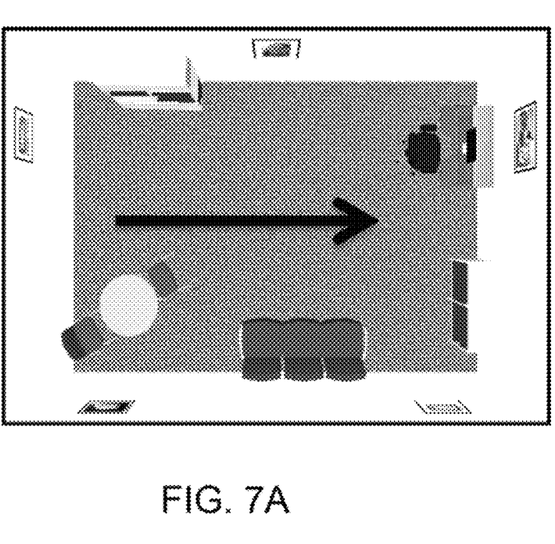
FIG. 7A is a top-down illustration of an example room through which a mobile platform traverses in a repeatable path.
Figure 7B:
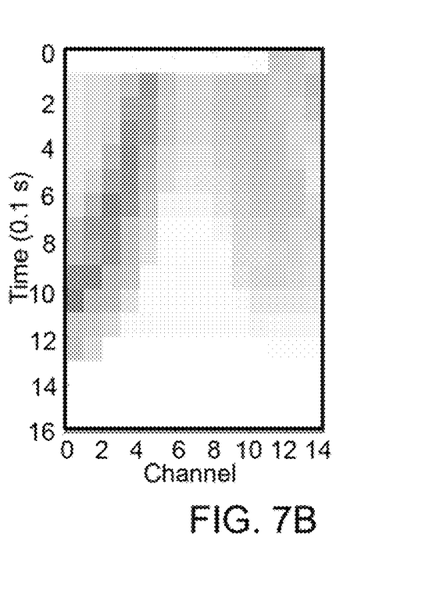
FIG. 7B is an illustration depicting the resulting two-dimensional signature after processing the visual information while moving through the room.

FIGS. 7A and 7B illustrate the signature for the same room but with a different furniture configuration. Notice that the differences between the two room signatures are visually distinguishable. FIG. 7A provides a top-down view of the space. The arrow indicates the approximate flight path. FIG. 7B depicts the resulting two-dimensional signature after processing the visual information while moving through the room.

(4.2) Simulated Example

For further understanding, provided below is a simple simulation environment that is attached to a liquid state machine. It should be understood that although this example demonstration of the system is provided, the example as provided is not representative of all possible embodiments and that the invention is not intended to be limited thereto.

Spiking neural networks are well suited for processing spatially and temporally varying signals. This kind of dynamic processing can be done a number of different ways and one of the more powerful techniques when the number of available neurons is limited, is the liquid state machines (LSM) (see Literature Reference No. 8. To apply stateless computing to this type of problem the described method is used to create a spatiotemporal pattern representing the room's unique signature.

Figure 8:
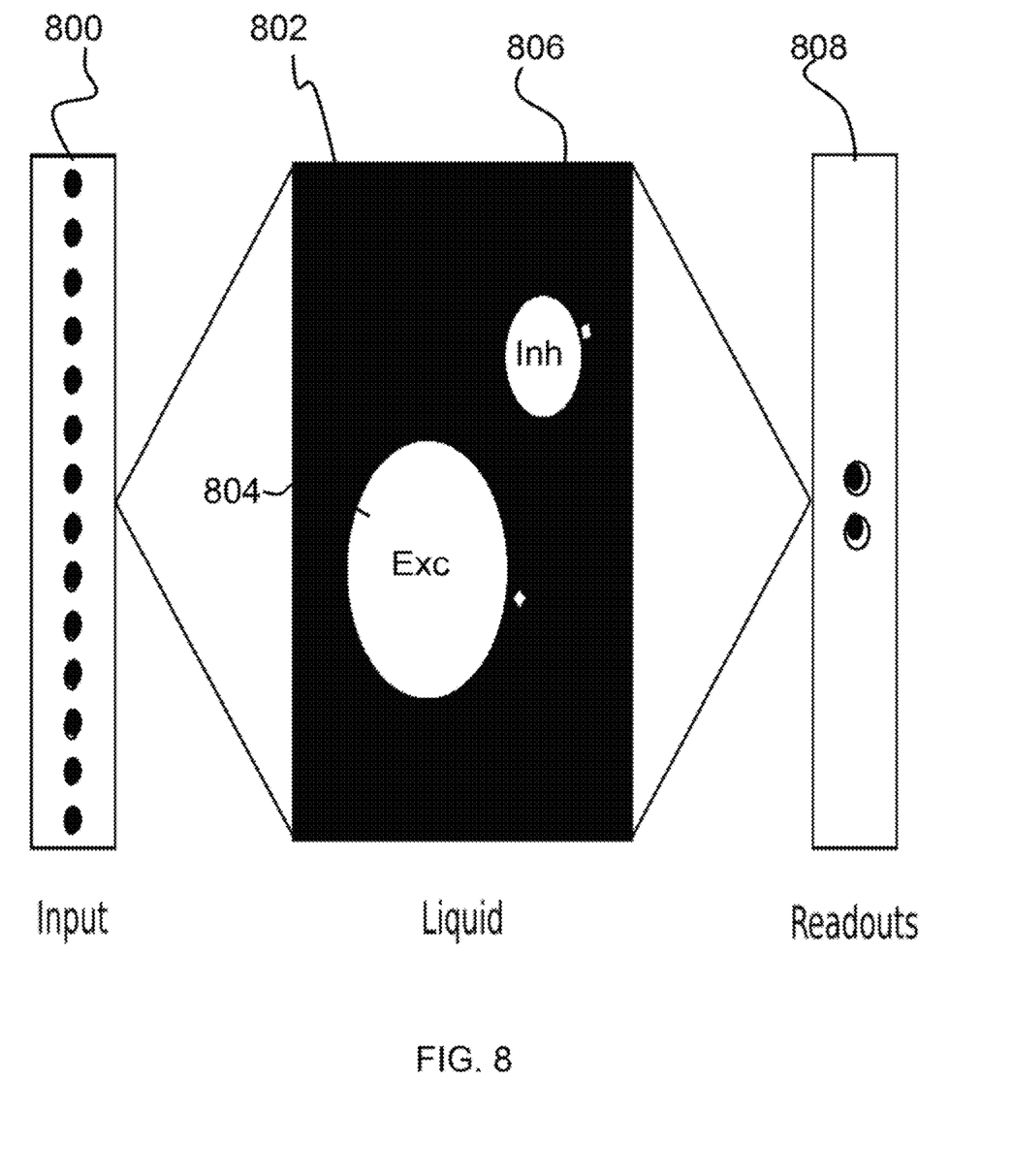
FIG. 8 is an illustration depicting an example implementation using a Liquid State Machine.

Images are captured at 10 Hz and for each image spikes are added to 14 input neurons along a 100 millisecond (ms) long window. The number of spikes is dependent on the value of the corresponding column. The input is processed by a LSM consisting of 216 neurons. There are 14 input neurons corresponding to each of the image columns. These are randomly connected to the liquid that consists of a recurrent network with 160 excitatory and 40 inhibitory neurons. This is used to represent the dynamic input as trajectories through the recurrent network. The high-dimensional liquid is then compressed into the low-dimensional space of 2 neurons. The LSM for this example is illustrated in FIG. 8, which shows the 14 input neurons 800 feeding into a liquid 802 comprising 160 excitatory neurons 804 and 40 inhibitory neurons 806. The liquid is then connected to 2 readout neurons 808.

Generally in LSMs, the weights of these input neurons are optimized to respond preferentially to a given input sequence. In this application the cost of optimizing the weights is likely too high to do online. Instead, the low-dimensional readout neurons are used to convert the liquid's complex trajectory into a simple one that can be classified by a simple computationally efficient classifier. For the feasibility study presented here a k-nearest neighbor algorithm was used. Spikes from the readout neurons are counted and binned on 100 ms windows. The resulting 14 value vector is then input into the classifier.

Three rooms were created in the simulation environment to demonstrate these concepts. A simple trajectory, with noise, down the middle of each room was followed. The noise creates a more realistic flight pattern and ensures that each presentation of the space is different. The rooms are presented in order and the classifier was trained on the first presentation of each. The system was then tested using 3 more presentations of each room. The results demonstrated that the proposed method is capable of creating unique signatures that can be used in classifiers even when the repeated movement is noisy.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for generating a unique signature for a enclosed space having immobile objects, the system comprising:
   one or more processors and a memory, the memory being a non-transitory computer-readable medium having executable instructions encoded thereon, such that upon execution of the instructions, the one or more processors perform operations of:
   capturing a plurality of images of the enclosed space around a mobile platform as the mobile platform is caused to make two or more passes through the enclosed space along a repeatable path;
   applying a filter to the image to generate vertical bins, the vertical bins being one-dimensional vectors of the enclosed space around the mobile platform; and
   combining the one-dimensional vectors over time by stacking the one-dimensional vectors to create a two-dimensional trace, the two-dimensional trace being a unique signature for the enclosed space.

2. The system as set forth in claim 1, wherein the system is mounted on the mobile platform and further comprising a sensor mounted on the mobile platform, the sensor generating the image of the enclosed space around the mobile platform.

3. The system as set forth in claim 2, wherein the image is captured and filtered into the vertical bins, with the vertical bins being sent directly to a continuous classifier while the mobile platform moves through the enclosed space along the repeatable path.

4. The system as set forth in claim 2, wherein the image is captured, filtered into the vertical bins and combined to create the two-dimensional trace while the mobile platform makes the two or more passes through the enclosed space along the repeatable path.

5. The system as set forth in claim 4, further comprising a classifier, with the two-dimensional trace being added to the classifier for later classification.

6. The system as set forth in claim 5, further comprising instructions for causing the mobile platform to make two or more passes through the enclosed space along the repeatable path.

7. The system as set forth in claim 1, further comprising instructions for causing the mobile platform to make two or more passes through the enclosed space along the repeatable path.

8. A method for generating a unique signature for a enclosed space having immobile objects, the method comprising acts of:
   capturing a plurality of images of the enclosed space around a mobile platform as the mobile platform is caused to make two or more passes through the enclosed space along a repeatable path;
   applying a filter to the image to generate vertical bins, the vertical bins being one-dimensional vectors of the enclosed space around the mobile platform; and
   combining the one-dimensional vectors over time by stacking the one-dimensional vectors to create a two-dimensional trace, the two-dimensional trace being a unique signature for the enclosed space.

9. The method as set forth in claim 8, wherein a sensor is mounted on the mobile platform, with the sensor generating the image of the enclosed space around the mobile platform.

10. The method as set forth in claim 9, wherein the image is captured and filtered into the vertical bins, with the vertical bins being sent directly to a continuous classifier while the mobile platform moves through the enclosed space along the repeatable path.

11. The method as set forth in claim 9, wherein the image is captured, filtered into the vertical bins and combined to create the two-dimensional trace while the mobile platform makes the two or more passes through the enclosed space along the repeatable path.

12. The method as set forth in claim 11, further comprising an act of adding the two-dimensional trace to a classifier for later classification.

13. The method as set forth in claim 12, further comprising an act of causing the mobile platform to make two or more passes through the enclosed space along the repeatable path.

14. The method as set forth in claim 8, further comprising an act of causing the mobile platform to make two or more passes through the enclosed space along the repeatable path.

15. A computer program product for generating a unique signature for a enclosed space having immobile objects, the computer program product comprising:
  a non-transitory computer-readable medium having executable instructions encoded thereon, such that upon execution of the instructions by one or more processors, the one or more processors perform operations of:
    capturing a plurality of images of the enclosed space around a mobile platform as the mobile platform is caused to make two or more passes through the enclosed space along a repeatable path;
    applying a filter to the image to generate vertical bins, the vertical bins being one-dimensional vectors of the enclosed space around the mobile platform; and
    combining the one-dimensional vectors over time by stacking the one-dimensional vectors to create a two-dimensional trace, the two-dimensional trace being a unique signature for the enclosed space.

16. The computer program product as set forth in claim 15, wherein a sensor is mounted on the mobile platform, with the sensor generating the image of the enclosed space around the mobile platform.

17. The computer program product as set forth in claim 16, further comprising instructions for causing the one or more processors to filter the image into the vertical bins, with the vertical bins being sent directly to a continuous classifier while the mobile platform moves through the enclosed space along the repeatable path.

18. The computer program product as set forth in claim 16, further comprising instructions for causing the one or more processors to filter the image into the vertical bins and combine the vertical bins to create the two-dimensional trace while the mobile platform makes the two or more passes through the enclosed space along the repeatable path.

19. The computer program product as set forth in claim 18, further comprising instructions for causing the one or more processors to add the two-dimensional trace to a classifier for later classification.

20. The computer program product as set forth in claim 15, further comprising instructions for causing the mobile platform to make two or more passes through the enclosed space along the repeatable path.

\* \* \* \* \*